Inventors
Alfred H. Mackley
William F. Flight
By
Attorney

Patented July 1, 1930

1,769,443

UNITED STATES PATENT OFFICE

ALFRED HENRY MACKLEY, OF BEDFORD, AND WILLIAM STANLEY FLIGHT, OF EALING, LONDON, ENGLAND

WIRELESS RECEIVING APPARATUS

Application filed November 1, 1924, Serial No. 747,155, and in Great Britain November 7, 1923.

This invention relates to wireless apparatus and has for its object the provision of means whereby the usual batteries for energizing the valve filaments may be dispensed with.

Other objects and advantages will appear hereinafter.

The invention may be said to reside essentially in the arrangement, in a wireless receiving apparatus including one or more valves, according to which the filament or filaments of the said valve or valves is or are adapted to be energized from ordinary alternating current mains through the medium of a step down transformer.

This step down transformer may be capable of receiving primary currents of widely varying potentials and transforming the primary currents into currents of different lower potentials by widely differing ratios so that it can be used with a variety of mains and will supply a variety of filaments; and to this end the transformer may comprise primary windings and secondary windings adapted to be selectively connected either in parallel or in series relation.

Preferably the transformer comprises two primary windings and two secondary windings and switch gear is provided such that the two primary windings may be connected in series while their corresponding secondary windings are in parallel, or such primary windings may be connected in parallel while the secondary windings are in series, or such primary windings and secondary windings may both be connected in series or may both be connected in parallel.

The invention further contemplates the arrangement according to which the filaments are connected across the output terminals of the transformer in parallel with a potentiometer or potentiometers substantially as hereinafter specified.

One embodiment of the invention as applied to a crystal detector three valve amplifying set of a well known kind, is illustrated in the accompanying drawings and the same will now be described it being understood that the particular construction and arrangement shown are susceptible of various modifications without departing from the scope of the appended claims.

In these drawings:—

Figure 1:
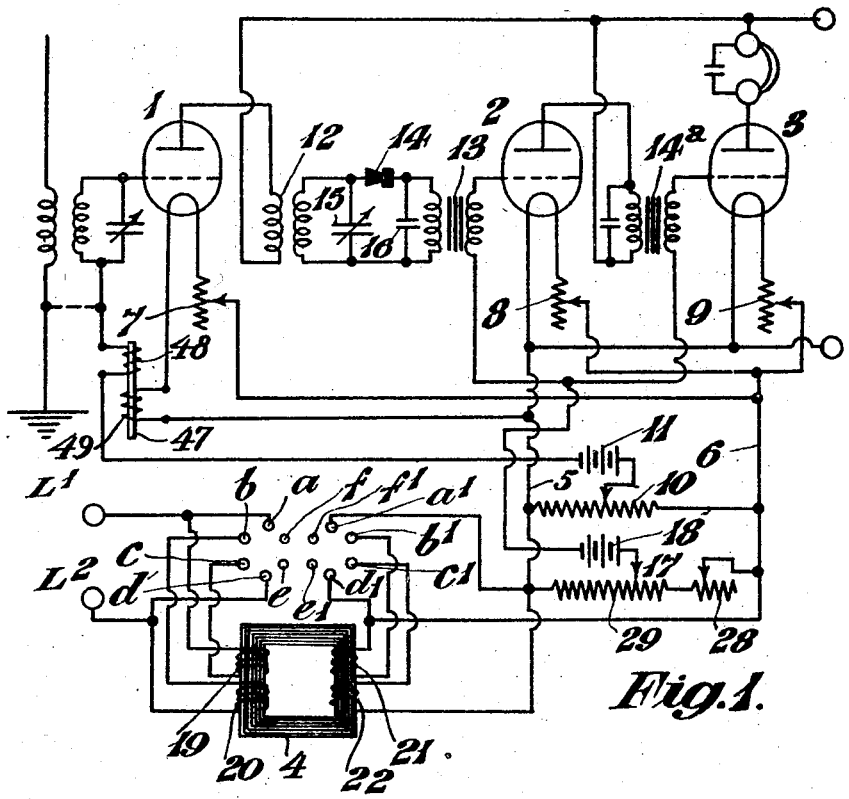
Figure 1 is a schematic view of the complete set.

Referring first to Figure 1, the filaments of the three valves 1, 2 and 3 are adapted to be supplied by means of a step down transformer 4 energized from alternating current lighting mains $L^1$, $L^2$. This transformer may be of any well known kind or it may be specially constructed so as to be capable of receiving primary currents of widely varying potentials and transforming them into currents at different lower potentials by widely varying ratios so that it can be used with a variety of mains and will supply a variety of filaments. In this latter case the transformer comprises primary windings and secondary windings adapted to be selectively connected either in parallel or in series relation.

An example of such a transformer is illustrated in the drawings and will be described later. For the present it is sufficient to state that the leads 5 and 6 are adapted to be supplied from the transformer with a suitable current for lighting the filaments of the three valves, which filaments are connected across these leads 5 and 6 in parallel, rheostats 7, 8 and 9 being connected each to each as shown in the individual circuits of said filaments. The amplifier input circuit is connected across the grid of the first valve 1 and the slide of a potentiometer 10 (of say two hundred ohms) connected across the said leads 5 and 6, a negative bias battery 11 of say 3.5 volts being connected in said circuit in the position shown. The said first valve 1 is adapted to supply and control the second valve 2 through the medium of a radio frequency transformer unit comprising transformers 12 and 13, a crystal detector 14 and condensers 15 and 16 all arranged, as shown, in accordance with well known practice. The output circuit of this transformer unit is connected across the grid of the said second valve 2 and the slide of a second potentiometer 17 (to be more particularly described hereinafter) also connected across the leads 5 and 6, a second negative bias battery 18 of similar voltage to the battery 11 being also connected in this output circuit. The second valve 2 is adapted to supply and control the third valve 3 through the medium of an audio frequency transformer 14$^a$ the secondary of which is connected across the grid of said third valve 3 and the slide of the aforesaid potentiometer 17 through the medium of the aforesaid battery 18.

Obviously however, instead of the common potentiometer 17 separate potentiometers may if desired be connected in the respective input circuits of the valves 2 and 3.

The function of the potentiometers is to keep the normal voltage of the grids at a steady value with respect to the average voltage of the electrical mid point of the filament and thus minimize the hum which variations of the grid voltage would otherwise produce. All the resistances of the device are adjusted until the hum is reduced to a minimum.

In some cases, however, it is not possible, by means of these potentiometers to entirely eliminate hum, owing to the fact that the grid connection to the alternating current is through the secondary of a transformer whereas the filament connection to the same alternating current is direct. This causes the potential fluctuations in the grid to be out of phase with those of the filament. In order to remedy such out of phase fluctuations between the grid and the filament (and, if necessary, the plate) we may employ a choke coil of a differential type formed of an iron core 47 on which are wound two windings 48 and 49, the former being connected in series in the grid lead and the latter being connected in series in the filament lead. These windings are in magnetic opposition and are so proportioned that when the potential fluctuations in them are in phase there is no flux in the core. Out of phase potential fluctuations, however, induce an alternating flux in the core so that the apparatus acts as a choke tending to damp out of phase voltages with an intensity proportional to the amount by which they are out of phase.

Describing now the step down transformer 4 and its associated parts the same comprises two primary windings 19 and 20 and two corresponding secondary windings 21 and 22 independently connectible either in series or parallel relation, so that the two primary windings may be connected in series while their corresponding secondary windings are in parallel, or such primary windings may be connected in parallel, while the secondary windings are in series, or such primary windings and secondary windigs may both be connected in series or may both be connected in parallel.

Thus these windings 19, 20, 21 and 22 are connected through the medium of switch gear to the mains $L^1$, $L^2$ and to the leads 5 and 6 in the following manner. The said gear comprises an insulating base member 24 bearing twelve stationary socket contacts arranged in two sets of six each, the one set consisting of contacts $a$, $b$, $c$, $d$, $e$ and $f$ and the other set consisting of contacts $a^1$, $b^1$, $c^1$, $d^1$, $e^1$ and $f^1$. The contacts $a$, $b$, $c$, $d$, $a^1$, $b^1$, $c^1$, $d^1$ are permanently connected to the other parts of the apparatus as shown in full lines in Figure 1 and the contacts $e$, $f$, $e^1$ and $f^1$ are dead. The contacts of each set are arranged symmetrically around a common centre and are separated from one another by equal intervals.

The switch gear also comprises two movable plug members 25 and 26 each having six prongs $a^2$, $b^2$, $c^2$, $d^2$, $e^2$, and $f^2$ disposed so as to be adapted to be plugged respectively into the six socket contacts of either set. As the plugs are symmetrically arranged it will be obvious that either plug could, by itself, be plugged into either set of socket contacts in any of six different angular positions, but owing to the fact that the body portions of the plugs are formed each with two flat faces F and that the two sets of sockets are so spaced that the plugs can only be both plugged at the same time when a flat face of each is in engagement with a flat face of the other, the plugs are only really capable of being plugged each in either of two positions viz., the plug 25 in positions in which the prongs $e^2$ and $f^2$ or the prongs $d^2$ and $e^2$ are vertical (according to the drawing) and the plug 26 in positions in which the prongs $e^2$ and $f^2$ or the prongs $f^2$ and $a^2$ are vertical (according to the drawing). As shown, moreover, in Figure 2 each plug has its prongs $a^2$, and $b^2$ and its prongs $c^2$ and $d^2$ connected together by metal strips 27, the prongs $e^2$ and $f^2$ being dead.

Thus, as is clear from Figure 1 when the plug 25 is in the first of its said two positions the contacts $a$ and $b$ and the contacts $c$ and $d$ will be bridged and electrically connected by the strips 27 and when the same is in the second of its two positions the contacts $b$ and $c$ will be connected by one of the strips 27, the other strip 27 being ineffective as it only serves to connect the contact $d$ to the contact $e$ which is dead. Similarly when the plug 26 is in the first of its said two positions the contacts $a^1$ and $b^1$ and the contacts $c^1$ and $d^1$ will be connected together, while, in the second of its two positions, the contacts $b^1$ and $c^1$ will be connected.

The plug 25 is adapted to control the connections of the primary windings 19 and 20 and the plug 26 is adapted to control the connections of the secondary windings 21 and 22 as will now be described.

As will be clearly seen from Figure 1, when the plug 25 is in the first of its two positions in which $b$ is connected to $a$ and $c$ is connected to $d$ the coil 19 will be connected directly across the mains $L^1$ and $L^2$ through $c$ and $d$ and the coil 20 will be connected directly across said mains through $a$ and $b$. When, however, the plug 25 is in the second of its two positions in which $b$ is connected to $c$ the coils 19 and 20 will be connected across the mains in series with one another.

In exactly the same way, the plug 26, in the first of its two positions connects the coils 21 and 22 in parallel across the leads 5 and 6, and, in the second of its two positions connects said coils in series with one another across said leads 5 and 6.

In the particular embodiment described the primary windings 19 and 20 are each adapted to take 120 volts and the secondary windings 21 and 22 are each adapted to take 3 volts. Therefore when the mains which it is required to use are in the neighbourhood of 240 volts the said primary windings will be connected in series across the mains with the plug 25 in its second position whereas they will be connected in parallel across the mains with the plug 25 in its first position when the mains are in the neighbourhood of 120 volts. On the other side when the filaments being used are of about 3 volts the secondary windings will be connected in parallel across the leads 5 and 6, with the plug 26 in its first position, whereas when they are of about 6 volts the secondary windings will be connected in series across the leads 5 and 6, with the plug 26 in its second position.

Against each straight face F is inscribed the voltage for which the respective plug is set when the said face is the face which is against one of the faces on the other plug.

In cases where only one low voltage supply is required, say at six volts it is obvious that only the plug 25 would be required, the secondary winding being of ordinary construction. In this case the flat faces F of the plug could co-operate with a suitable fixed flat face.

The aforesaid potentiometer 17 is specially designed so as to give the very fine control which is sometimes found necessary especially in connection with valves of low frequency. To this end a rheostat winding 28 of say 30 ohms maximum resistance is connected in series with the winding 29 of a potentiometer proper of say 300 ohms resistance (see Figures 1 and 4). Obviously when the closest possible adjustment has been made on the slide of the winding 29 the potential at the said slide may be very much more closely adjusted through adjustment of the slide of the rheostat winding 28.

Figures 2, 3, 4:
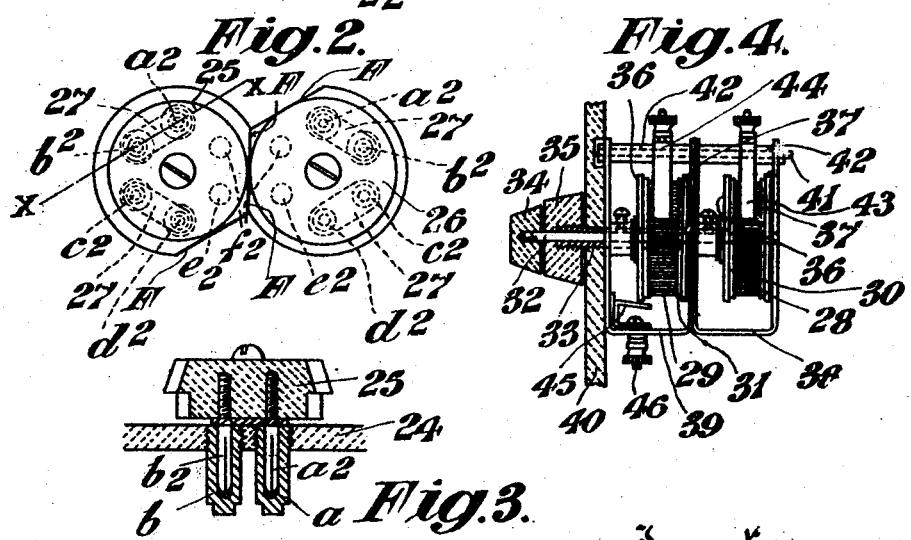
Figure 2 is an enlarged view of certain control elements used in said set.
Figure 3 is a section upon line X—X of Figure 2.
Figure 4 is a view of a vernier potentiometer included in said set.

As shown in Figure 4 the windings 28 and 29 extend around the peripheries of respective insulating drums 30 and 31 which drums are mounted respectively upon concentric shafts 32 and 33 adapted to be independently rotated by knobs 34 and 35. Each of the drums is provided with flanking side plates 36 and 37 of metal and the drums are mounted respectively in metallic U-shaped brackets 38 and 39 which form bearings for the shafts 32 and 33 as shown. The said brackets are secured and electrically connected together and the bracket 39 is secured to a panel 40 of the instrument. A rod 41 secured to the said panel and passing through the upper ends of the U-shape brackets serves both to strengthen the whole structure and to support (with insulating sleeves 42 in between) the leaf spring contactors or slides 43 and 44 of the respective windings. The series connection of the two windings is established through the respective plates 37, each of these plates being electrically connected both to one end of the respective winding and (preferably through the medium of a spring washer not shown) the respective bracket 38 or 39. The other end of each winding is connected to the respective plate 36 and thence, through the spring contactor 45, to a terminal 46 mounted in insulated relation upon the bracket 39.

What we claim and desire to secure by Letters Patent is:—

1. A wireless receiving apparatus comprising an electron discharge valve of the audion type the filament of which is adapted to be energized by means of alternating current, means for establishing the input circuit to the valve at the filament end through an adjustable tapping point of a resistance connected in parallel to the valve filament, and means whereby the said alternating current for energizing the valve filament is supplied through the medium of a transformer having primary and secondary windings, at least one of said windings being divided into a plurality of portions adapted to be connected in series or in parallel relation selectively.

2. A wireless receiving apparatus comprising a plurality of electron discharge valves of the audion type the filaments of which are respectively adapted to be energized by means of alternating current, means for establishing the input circuits to the respective valves at the filament ends through adjustable tapping points of resistances connected in parallel to the valve filaments, and means whereby the said alternating current for energizing the valve filaments is supplied through the medium of a transformer having primary and secondary windings, at least one of said windings being divided into a plurality of portions adapted to be connected in series or in parallel relation selectively.

3. A wireless receiving apparatus according to claim 2, comprising a differential type choke coil having an iron core on which are wound two windings, one of which is in the grid lead and the other of which is in the filament lead, substantially as and for the purpose specified.

4. A wireless receiving apparatus according to claim 2, wherein the primary and secondary windings of the said transformer are each divided into two portions and have each an associated switch having a fixed part which carries four contacts connected respectively to the four ends of said two portions and a movable part which carries two bridging members and is adapted to be moved selectively to a position in which said bridging members bridge pairs of said contacts for connecting the portions in parallel relation or to a position in which one of the bridging members bridges two of said contacts for connecting the portions in series and the other bridging member is dead.

5. A wireless receiving apparatus according to claim 1, wherein the said resistance which is connected in parallel to the valve filament comprises two portions wound separately on concentric drums and connected in series with one another, one of said portions having a variable tapping contactor associated therewith and the other portion having a variable contactor for varying the total resistance for the purpose specified.

In witness whereof we affix our signatures.
ALFRED HENRY MACKLEY.
WILLIAM STANLEY FLIGHT.